Oct. 23, 1934.  G. W. OEHLSEN, JR  1,977,889
TUNING MECHANISM FOR RADIO RECEIVING SETS
Filed Sept. 14, 1932   2 Sheets-Sheet 1
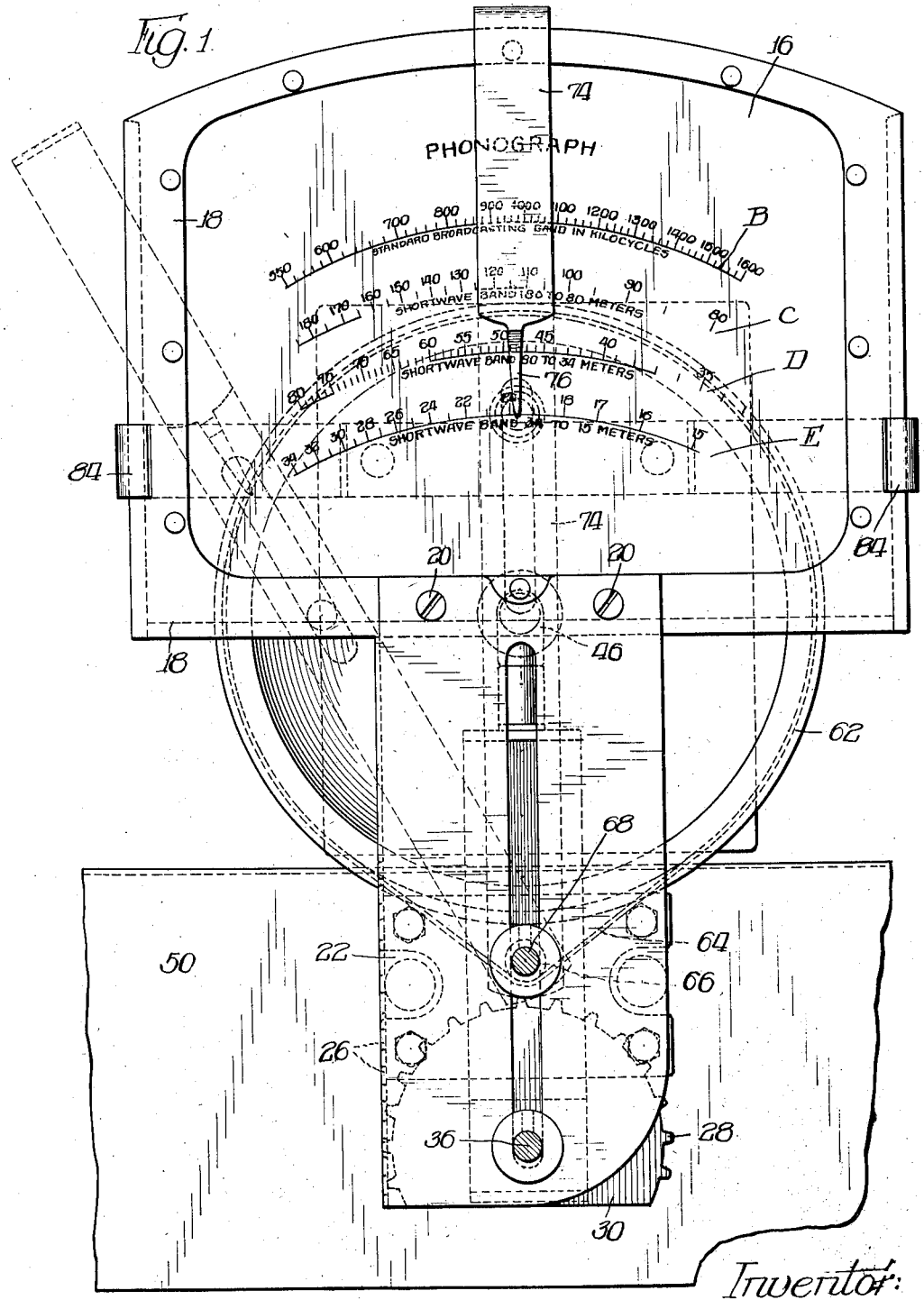
Inventor:
George W. Oehlsen, Jr.

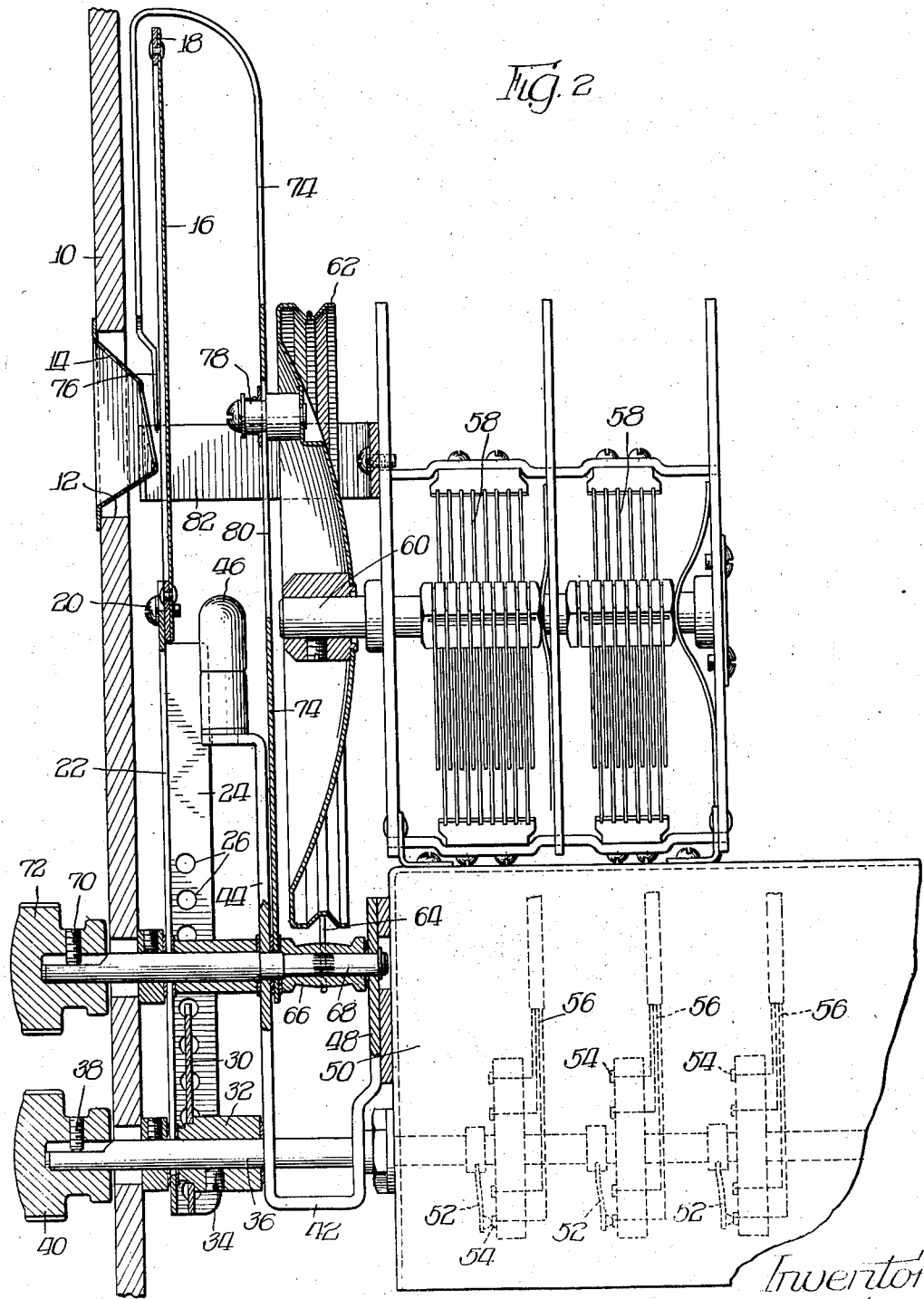

Patented Oct. 23, 1934

1,977,889

UNITED STATES PATENT OFFICE 1,977,889

TUNING MECHANISM FOR RADIO RECEIVING SETS

George W. Oehlsen, Jr., Chicago, Ill., assignor to Stewart-Warner Corporation, Chicago, Ill., a corporation of Virginia Application September 14, 1932, Serial No. 633,140

10 Claims. (Cl. 250—40)

This invention relates to improvements in tuning mechanism for radio receiving sets, principally of the type which are adapted to receive not only frequencies in the standard broadcast band but also any wide band of frequencies or channels.

Radio receiving sets adapted to receive not only standard broadcast frequencies but also higher frequencies now are being generally used but to render such a set serviceable to the ordinary user it is necessary to design the set in such a manner as to eliminate unnecessary controls and to make the tuning as simple and efficient as possible. It is well known that in order to cover the desired range of high and low frequencies, the inductance or capacity of the circuit must be changed to cover the different bands. Furthermore, it is clearly evident that it is quite impractical to employ a single tuning scale to cover the entire range of the set, since adjacent channels will be crowded too close to each other on the scale. It would also be very confusing if a plurality of scales were marked on a single fixed member whereby the operator with all the scales in view should tune on different scales as the inductance or capacity of the circuit is changed by a multi-position switch.

It is a purpose of the present invention to disclose simple and efficient apparatus whereby a plurality of scales may be shifted, as the inductance or capacity of the circuit is changed in discrete steps, to bring the scale covering the desired band into view and into association with the pointer or indicator.

It is further an object of the present invention to provide in a radio receiving set a construction such that only a single scale is viewed at one time from the front of the set as the set is tuned by the adjustment of a single frequency selector, whereas the band of reception may be changed from time to time as desired by operating a single knob which simultaneously shifts the scales and changes the inductance or capacity of the circuit in discrete steps.

Further objects and advantages of my improvements will be more readily apparent from the following description taken in connection with the attached drawings, in which Figure 1 is a front elevation of the tuning device, and Figure 2 is a cross section showing the tuning device and, diagrammatically, the switches operated when the tuning scales are shifted.

The front panel of the radio set is indicated 10 and has mounted in opening 12 thereof an escutcheon plate 14 through which may be viewed one of the scales B, C, D or E, which are marked on the vertically adjustable scale plate 16 of translucent material. The plate 16 is fastened to a frame 18 which is in turn secured by screws 20 to a rack member 22. Rack 22 has a flange 24 including a plurality of openings 26 adapted to receive the teeth 28 of a rotatable sector gear 30. The gear 30 is fastened to a hub 32 secured by screw 34 to shaft 36.

The shaft 36 protrudes through an opening in the panel 10 and has fastened thereto by screw 38 a band selector knob 40. The shaft 36 is mounted in the side walls of a bracket 42, one arm 44 of which affords a mounting for the light bulb 46 which serves to illuminate the tuning scales. The other arm 48 of the bracket 42 is fastened to the casing 50 into which the shaft 36 extends. Upon the shaft 36 within the casing 50 are mounted a plurality of switch arms 52 diagrammatically illustrated and cooperating with fixed switch contacts 54. The wires 56 from the contacts 54 lead to the variable inductances of the receiving circuit.

The tuning condensers 58 are mounted on top of the casing 50 and are controlled by shaft 60 which has mounted thereon a pulley 62 driven by belt 64 from pulley 66 which is fastened to shaft 68. The shaft 68 protrudes through the panel 10 and has fastened thereto by screw 70 a frequency selector knob 72. The shaft 68 also serves as a pivotal support for an arm 74 which, as shown, extends over the top of the frame 18 and carries an indicating finger 76 disposed between the escutcheon plate and the scales. The indicator 76 is moved when the tuning condensers are adjusted by the provision of a stud 78 engaging a vertical slot 80 in the arm 74. The stud 78 is eccentrically mounted on the pulley 62 whereby, as the pulley 62 is rotated, the arm 74 will be swung and the indicating finger will move along the scale which is in view.

It will be noted, as an example, that the scale B covers the standard broadcast band from 540 to 1600 kilocycles. Scale C covers the short waves between 195 and 75 meters. Scale D covers the short wave range between 75 and 30 meters. Scale E covers the short wave range between 30 and 15 meters. Any one of these scales may be brought into position by adjustment of the knob 40 and simultaneously the switch contacts in the casing will be actuated to change the inductance of the set. The vertical movement of the scale plate 16 is guided by a fixed bracket 82 having inturned fingers 84 receiving the vertical edges of the frame 18.

It will be noted that only two controls are required and the scales are so designed that the frequency channels will not be crowded close together. Only a single scale covering a definite range is in view at one time.

Although the specific embodiment shown in the figures of the drawings show a variable condenser as the tuning element and inductances shown for selecting predetermined ranges or bands of frequencies, it is understood that the invention is not to be limited by this particular association of these elements, but that they can be changed and re-arranged to suit the requirements of a particular problem and also that they can be changed and re-arranged in accordance with well-known radio practices.

I claim:

1. In an electrical device, a panel, an escutcheon plate mounted in said panel having an opening through which a single tuning scale may be viewed, a frequency selector knob mounted on the front of said panel, means controlled by movement of said frequency selector knob for adjusting a variable tuning element, a pointer cooperating with the tuning scale which is in view through said escutcheon plate, means for adjusting the position of said pointer as the variable tuning element is adjusted, a vertically adjustable member having a plurality of tuning scales thereon, a band selector knob on the front of said panel for moving said member up or down to bring one of said scales into position for view through said escutcheon plate and means also controlled by movement of said band selector knob for changing the fixed tuning element of the device simultaneously with the shifting of the scales.

2. In an electrical device, a fixed framework, a member having a plurality of tuning scales marked thereon guided for vertical movement by said framework, a rotatable shaft, a gear on said shaft for vertically adjusting said tuning scale member by rotation of said shaft, means associated with said shaft for varying the fixed tuning element of the device simultaneously with the shifting of the scales, a second rotatable shaft, a variable tuning element, means for adjusting said tuning element through rotation of said second shaft, a movable pointer adapted for cooperation at any time with one of the scales of said tuning scale member and means for moving said pointer across said scale as the setting of the tuning element is modified.

3. In an electrical device, a fixed casing, a rotatable shaft mounted in said casing and extending outwardly therefrom, switch means for varying the fixed tuning means of the device mounted in said casing and associated with said shaft, variable tuning means including a rotatable shaft, a drum mounted on said shaft, a second shaft mounted above said first-mentioned shaft, means for rotating said drum to vary the variable tuning means by movement of said second shaft, a movable pointer pivotally mounted on said second shaft, an eccentric pin mounted on said drum engaging a slot in said pointer to move said pointer as the setting of the variable tuning means is modified, a tuning scale member having a plurality of tuning scales marked thereon mounted for vertical movement, fixed guiding means engaging the side edges of said member for guiding the movement thereof and inter-engaging means between said tuning scale member and said first-mentioned shaft for shifting one of said tuning scales into association with the pointer as the fixed tuning means of the device is changed.

4. Radio apparatus comprising a scale member having separate portions for separate tuning ranges, said portions each being distinctive in appearance, the scale member being slidably mounted to move transversely of said portions.

5. Radio apparatus comprising a scale member having separate portions each of which embraces a particular tuning range, means for moving said member to bring each of said portions successively into indicating position, each of said portions presenting a distinctive appearance, the scale member being slidably mounted to move transversely of said portions.

6. Radio apparatus comprising a scale member having separate portions each of distinctive appearance, each portion covering a particular tuning range, and means for bringing each portion into exposed position, the scale member being slidably mounted to move transversely of said portions.

7. Radio apparatus comprising a translucent scale member, a plate having vertical guideways, means for moving said member in said guideways and an indicator element movable across the face of said member, the latter having portions each embracing a separate tuning range.

8. Radio apparatus comprising a slidably mounted plate having transverse portions, one above the other, with graduations thereon, each portion embracing a different tuning range, an indicator element movable across said plate, a part to actuate the plate and displace same, and means connected to said indicator element and the part to actuate the plate to enable adjustment of the apparatus according to the tuning range selected.

9. Radio apparatus comprising a scale member, a plate having guideways, means for moving said member in said guideways and an indicator element movable across the face of said member, the latter having portions each embracing a separate tuning range.

10. Radio apparatus comprising a scale member having transverse portions distinguishable from one another, each portion having graduations thereon embracing a different tuning range, an indicator element movable across the scale member, a part to actuate the scale member and displace same to bring the transverse portions separately into cooperating position with respect to said element, means connected to said element to be regulated thereby upon movement of said element and means connected to the scale member to be regulated thereby when the scale member is moved to adjust the apparatus in accordance with the tuning range selected.

GEORGE W. OEHLSEN, Jr.